United States Patent [19]
Schwab et al.

[11] Patent Number: 5,922,103
[45] Date of Patent: *Jul. 13, 1999

[54] AUTOMATIC GAS CONDITIONING METHOD

[75] Inventors: James J. Schwab, Napa; Joseph R. Riley, Sonoma, both of Calif.

[73] Assignee: Envirocare International Inc., Novato, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/541,218

[22] Filed: Oct. 12, 1995

[51] Int. Cl.$^6$ ..................................................... B03C 3/014
[52] U.S. Cl. ................................. 95/8; 95/3; 95/4; 95/16; 95/65; 95/72; 96/25; 96/26; 96/53; 96/74
[58] Field of Search ............................... 95/8, 16, 71, 72, 95/3, 4, 64–66; 96/74, 52, 53, 25, 26

[56] References Cited

U.S. PATENT DOCUMENTS

| | | | |
|---|---|---|---|
| 3,842,615 | 10/1974 | Reigel et al. | 62/171 |
| 3,984,217 | 10/1976 | Huntington | 95/16 |
| 4,070,424 | 1/1978 | Olson et al. | 95/71 X |

OTHER PUBLICATIONS

"GA90–160 Series Oil Injected Rotary Screw Compressor," Atlas Copco Technical Disclosure Bulletin, pp. 1–3 (of 3) and p. 3 (of 6), Mar. 1, 1992.
Werner, "Electrostatic precipitators in cement plants," *International Cement Review*, pp. 61–65, Aug. 1991.
Riley, et al., "Re–evaluating evaporative gas conditioning: Is feasibility still an issue?," *International Cement Review*, pp. 36–40, Nov. 1990.
"GA45–75 Series Rotary Screw Compressors," Atlas Copco Product Information Brochure, pp. 1–8, Nov. 1989.
"Atlas Copco GA45–75 Features/Benefits," Atlas Copco Technical Disclosure Bulletin, pp. 1–2, Jun. 1, 1989.
"GA45–75 Series Oil Injected Rotary Screw Compressor," Atlas Copco Technical Disclosure Bulletin, pp. 1–5, May 1, 1989.
"Swirl–Art® Air Atomizing Nozzle," Delavan Industrial Products Operation, Product Information Brochure, pp. 36, 40, 40, 43, 1987.
Tassicker, et al., "High–Intensity Ionizer for Improved ESP Performance," *EPRI Journal*, pp. 56–58, 61, Jun./Jul. 1977.
"MicroMist™ Evaporative Gas Cooling And Conditioning System," EnviroCare International, Product Information Brochure, date unknown.

*Primary Examiner*—Richard L. Chiesa
*Attorney, Agent, or Firm*—Coudert Brothers

[57] ABSTRACT

An air pollution control system using a novel control system is disclosed. The control system is particularly useful with a gas conditioning tower ("GCT") which uses a spray from a two-fluid nozzle to cool hot process gases prior to flowing to an electrostatic precipitator. A first control loop, employing, for example, a temperature feedback control system, is used during normal operation of the system, and an override control loop is used to protect the electrostatic precipitator from overheated gases which may be diverted in the case of a plant upset. The override control loop adjusts the spray based on a calculation of the spray characteristics needed to meet the new GCT conditioning requirements. In another aspect the present invention relates to a method and apparatus for optmizing the spray from a two-fluid nozzle used in a GCT. In particular, the spray droplets are made larger when possible, thereby reducing the energy usage of the system. In yet another aspect of the present invention, the controller used in the air pollution control system directly regulates delivery pressure of the air compressor used as a source of compressed air for the two-fluid nozzle, for further energy savings.

17 Claims, 7 Drawing Sheets

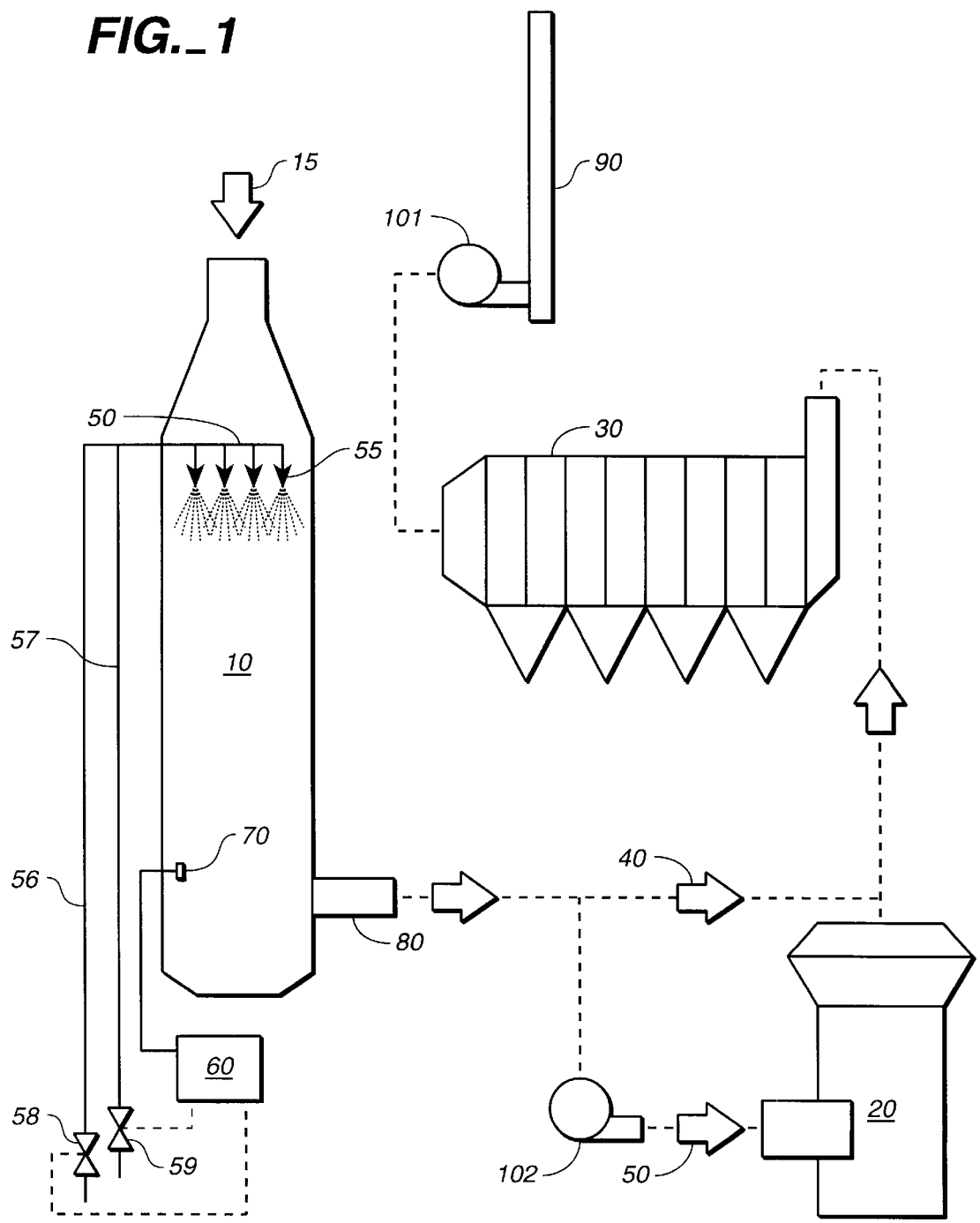
FIG._1

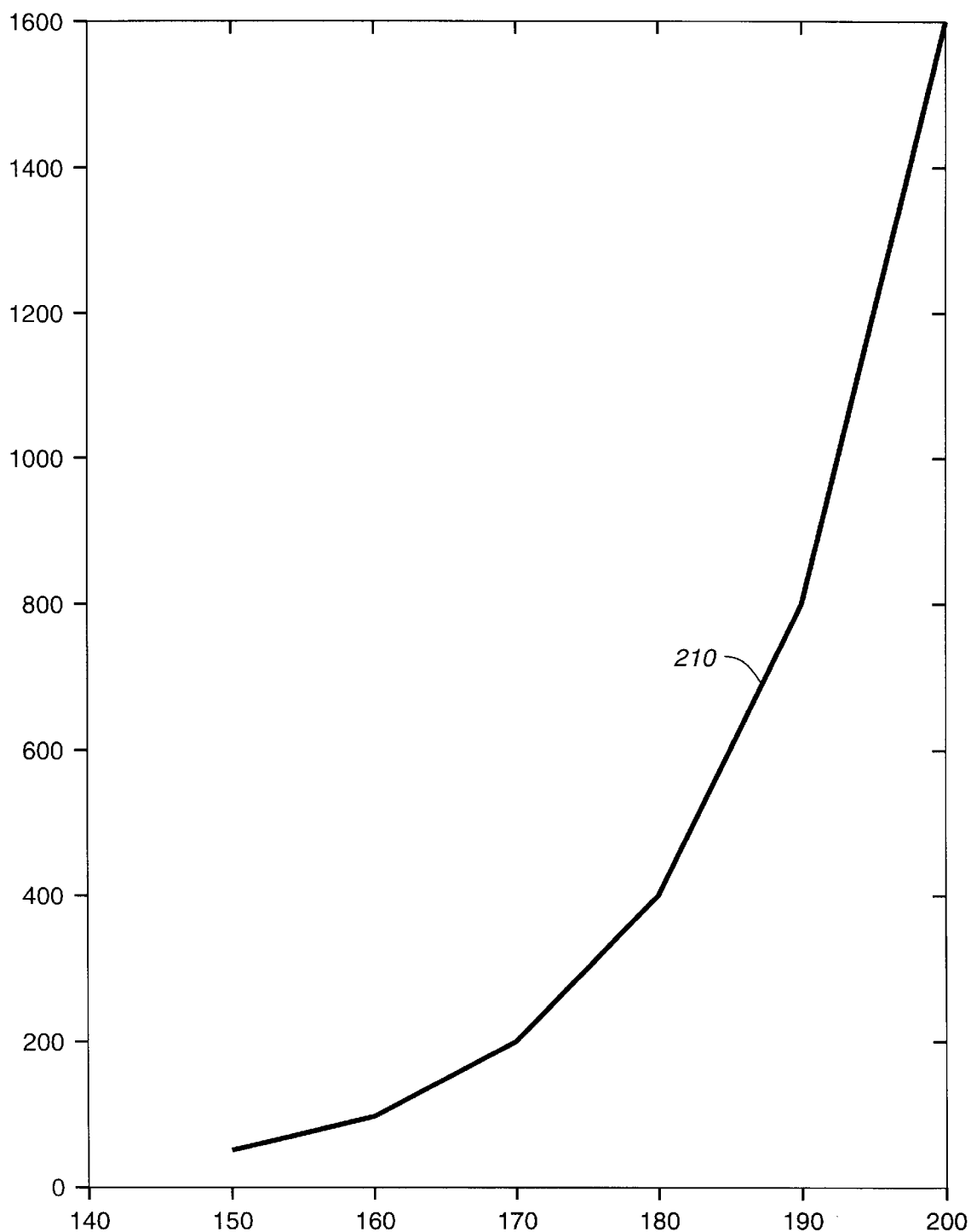
FIG._2

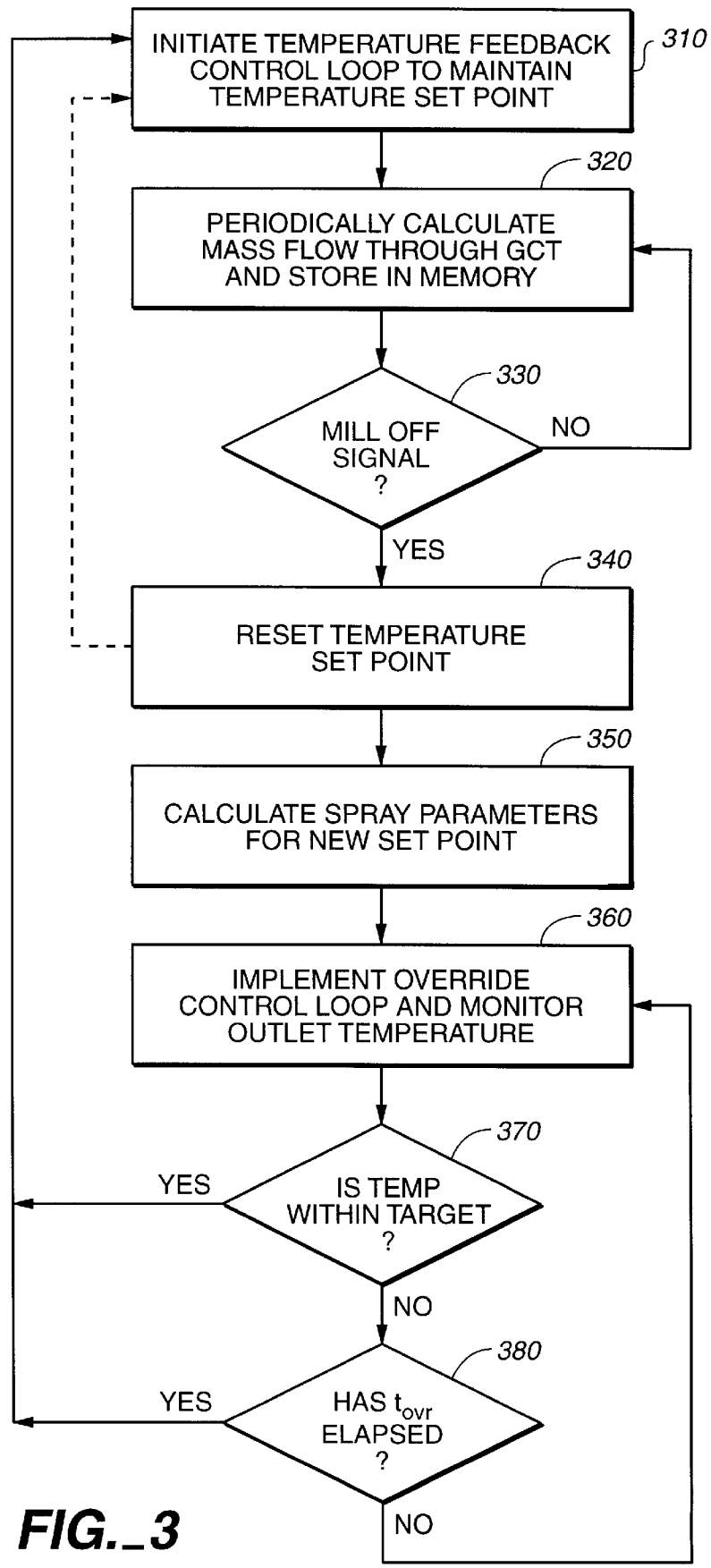
FIG._3

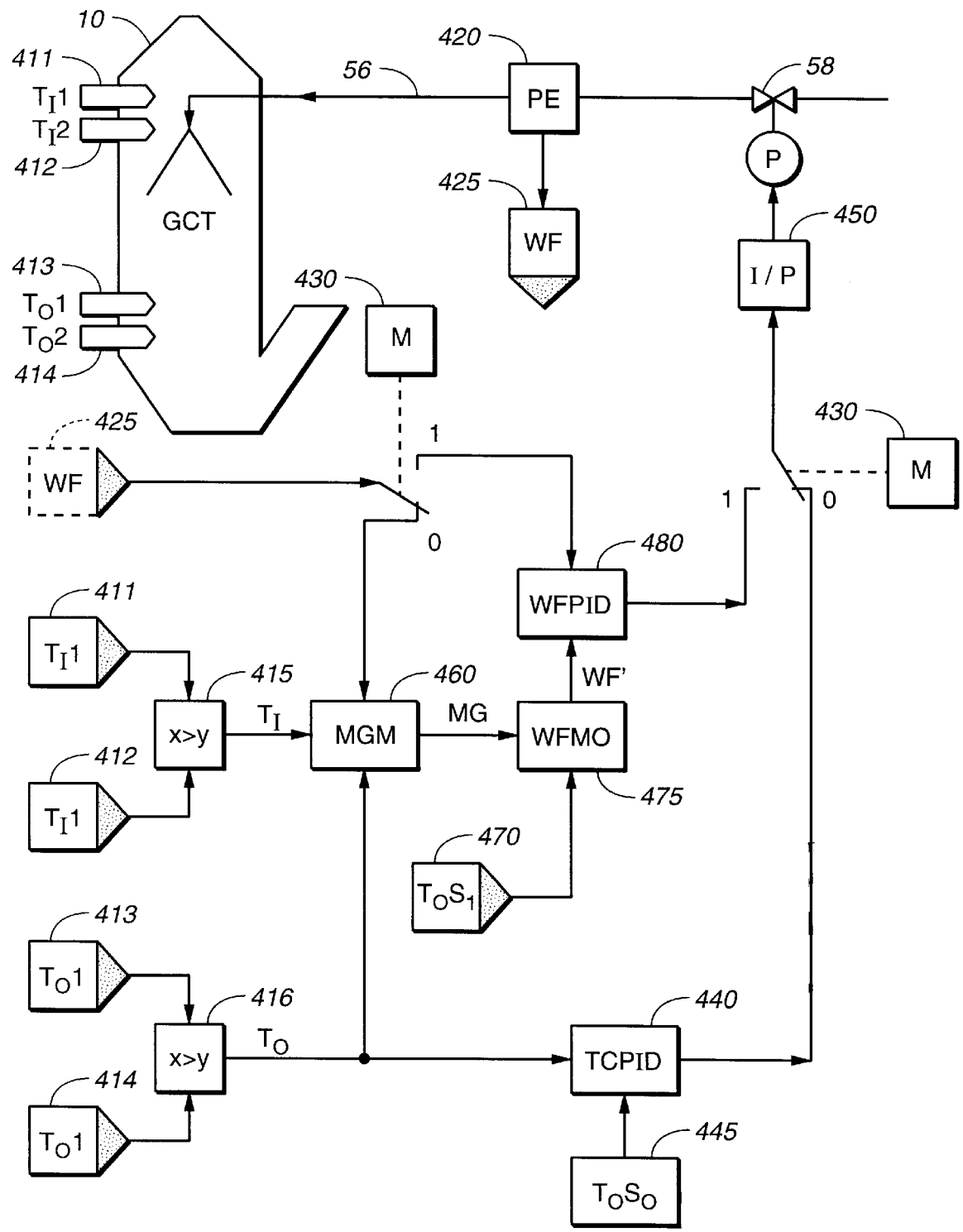
FIG._4

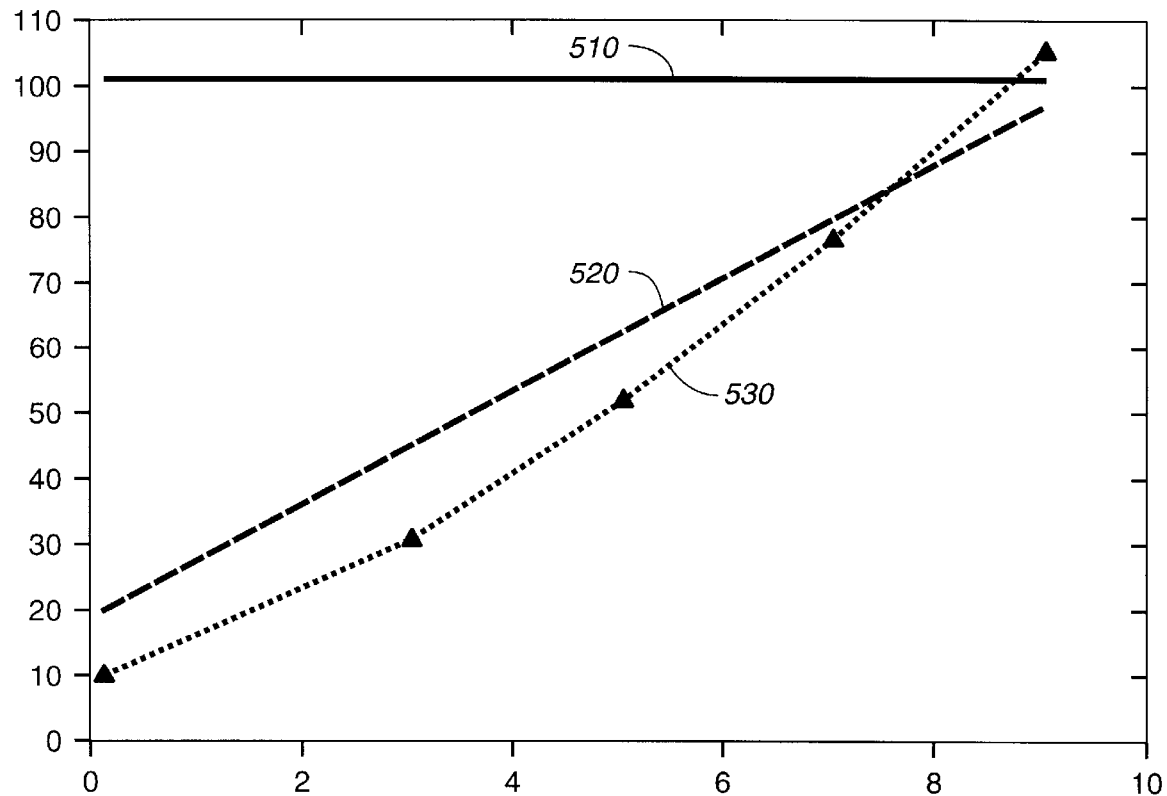
FIG._5
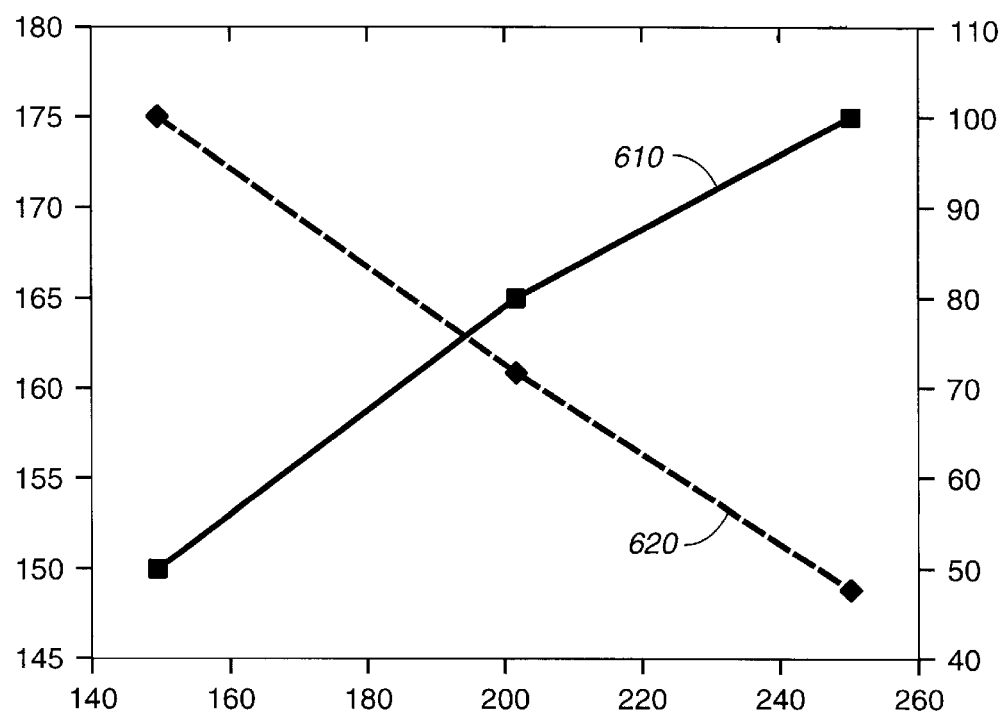
FIG._6a

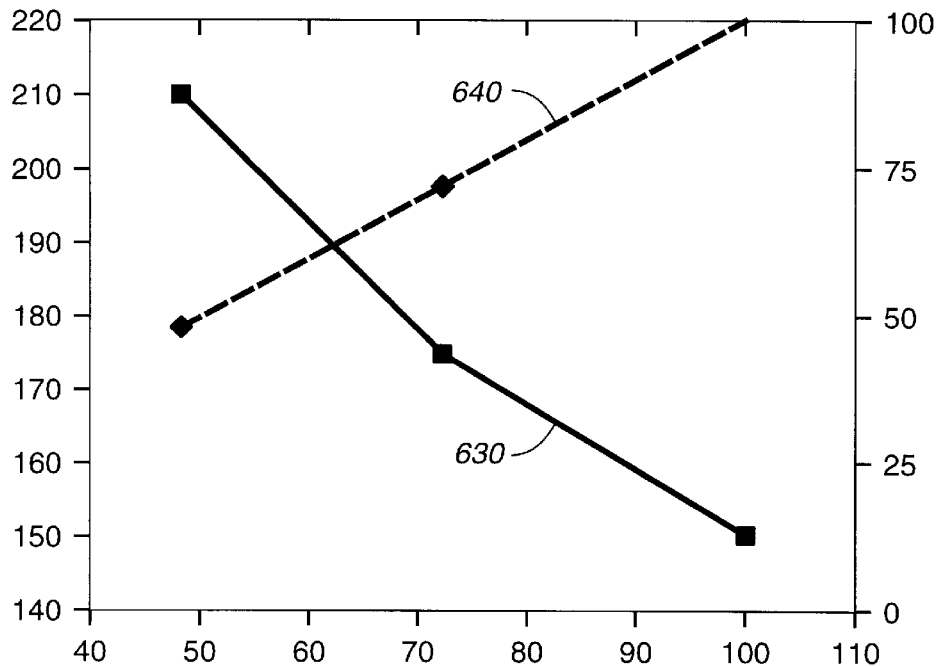
FIG._6b
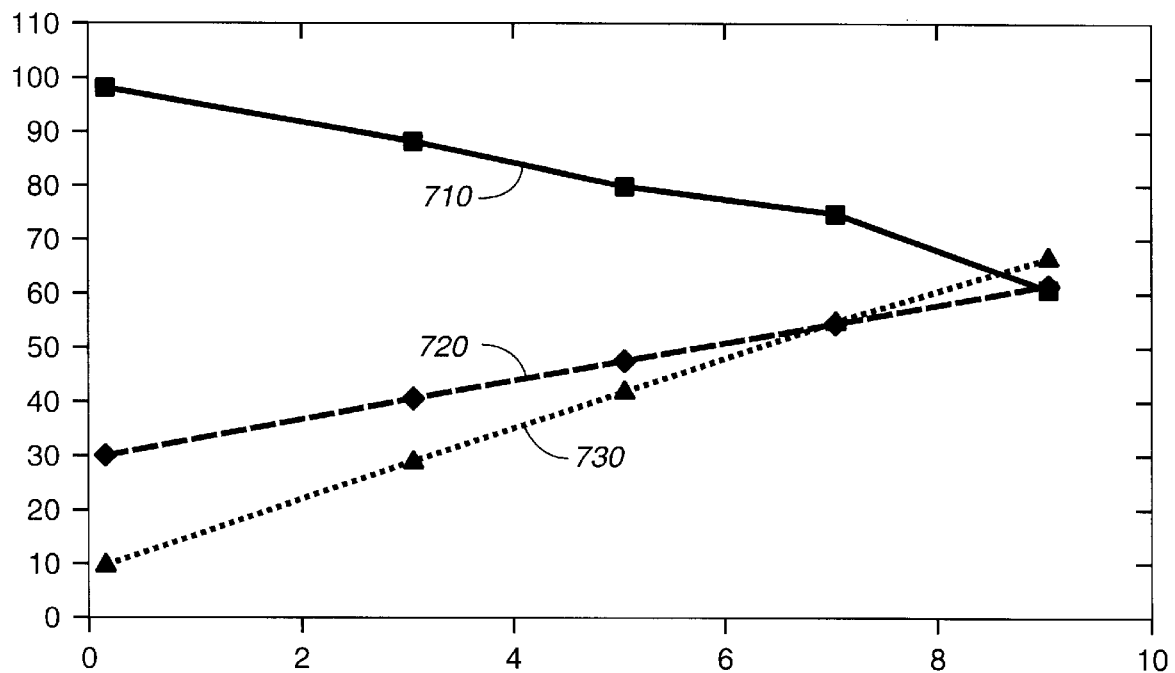
FIG._7a

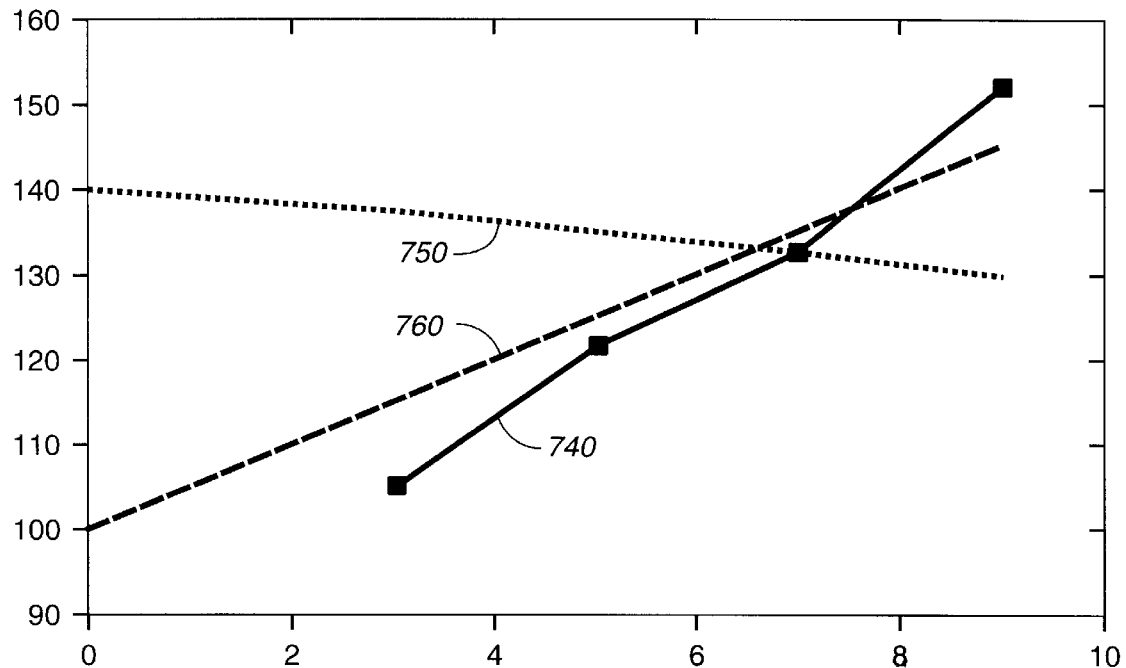
FIG._7b
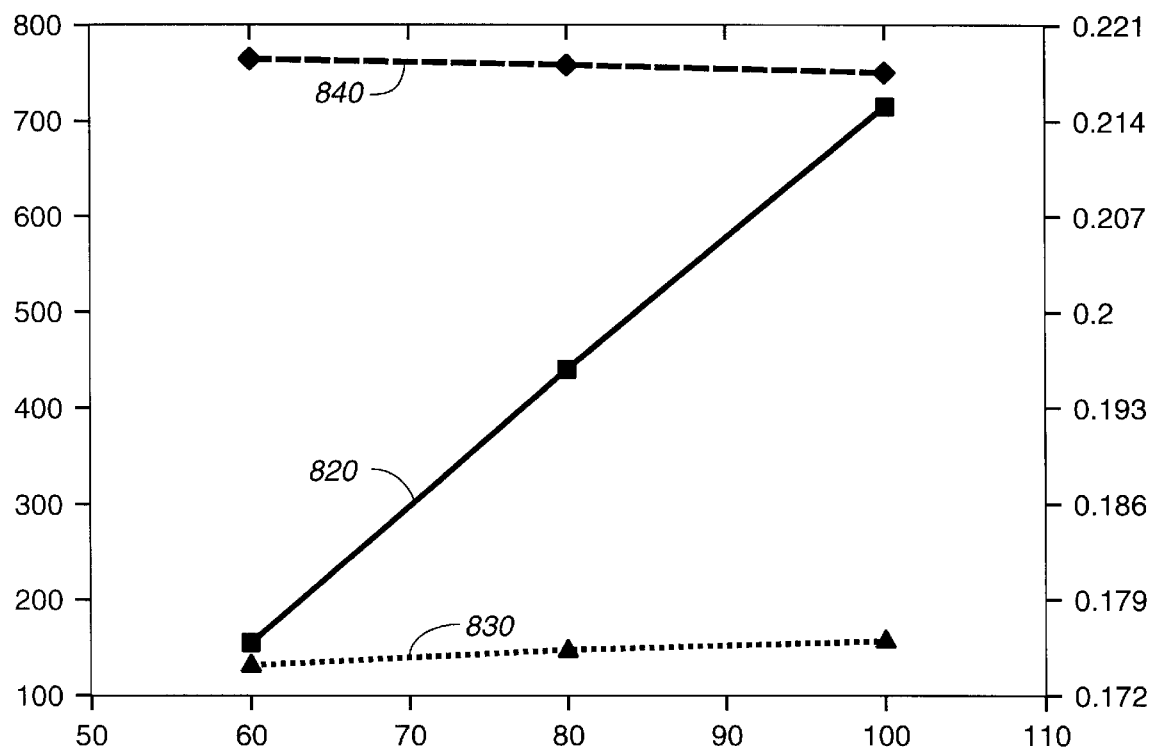
FIG._8

AUTOMATIC GAS CONDITIONING METHOD

FIELD OF THE INVENTION

This invention relates to the field of air pollution control, and is particularly directed to an improved automatic control system for dust conditioning ahead of an electrostatic precipitator for removing contaminant particles from a hot gaseous effluent stream.

BACKGROUND OF THE INVENTION

Over the past several decades the control of air pollution has become a priority concern of society. The United States and other countries have developed elaborate regulatory programs aimed at requiring factories and other major sources of air pollution to install the best available control technology (BACT) for removing contaminants from gaseous effluent streams released into the atmosphere. The standards for air pollution control are becoming increasingly stringent, so that there is a constant demand for ever more effective pollution control technologies. In addition, the operating costs of running pollution control equipment can be substantial, so there is also a constant demand for more energy efficient technologies.

One well-known type of device for removing contaminants from a gaseous effluent stream is the electrostatic precipitator (ESP). ESPs are generally recognized as being capable of high particle collection efficiency, especially of fine particles, when the particles have the proper electrical resistivity; see, e.g., O. Tassicker and J. Schwab, *High-Intensity Ionizer for Improved ESP Performance*, EPRI Journal (June/July 1977), pp. 56 et seq. The optimum range of dust resistivity in situ is typically between about $10^8$ and $10^{11}$ ohm cm. In many industrial applications, the suspended dust particles in the effluent gas streams are not in this range for the gas conditions entering the ESP. Therefore the dust particles must be conditioned prior to entry into the ESP by changing the gas temperature or increasing moisture content of the gases or both; see, e.g., G. Werner, *Electrostatic precipitators in cement plants,* International Cement Review (August 1991), pp. 61 et seq.; and, J. R. Riley and John M. Tate, *Re-evaluating evaporative gas conditioning: Is feasibility still an issue?*, International Cement Review (November 1990), pp. 36, et seq.

A typical application for an ESP is in cement manufacturing. While cement manufacturing will be described herein for illustrative purposes, it is to be understood that the present invention is equally applicable to other manufacturing processes. In the manufacture of cement, the operation of a gas conditioning tower (GCT) is critical to the successful capture of the cement dust particles by the downstream ESP. FIG. 1, described in detail below, shows a process flow diagram of the typical air pollution equipment for the cement kiln/preheater tower gases in a modern cement plant. The GCT 10 is used to condition the hot, dry gases from the preheater tower (shown schematically by arrow 15) by reducing their temperature and increasing the moisture content by injecting cooling water into gas flow. The cooling water serves both to directly lower the temperature of the flow and to increase its moisture content. Most of the time, while the mill is in normal operation, the gas flows through the raw feed mill 20 and the moist raw feed in the mill assists GCT 10 in conditioning the gases before they enter the ESP 30. The raw feed in mill 20, i.e., cool, wet limestone, creates a large heat exchange surface, decreasing the temperature of the gases and increasing the moisture content before the they flow to ESP 30. However, when raw feed mill 20 is not in operation, GCT 10 must be operated to condition the gases before the ESP 30 without the cooling and moisture release provided when the gas flows through the raw feed mill. (When raw feed mill 20 stops operating it is normally imperative to quickly divert the hot gases from flowing through the mill to avoid damage to the mill.) Thus, two main operating conditions exist for the GCT in a cement manufacturing application: one when the raw mill is on line, "mill-on," shown by arrow 50 and the other, more difficult, condition when the raw mill is off line or bypassed, "mill-off," as shown by arrow 40.

Typical emissions of particles from the cement kiln/preheater tower off-gases is shown in the graph in FIG. 2 when the gases are conditioned by the evaporative cooling of water. In FIG. 2, the temperature in degrees centigrade of the gases entering the ESP is shown on the x-axis, while the particle emissions in $mg/Nm^3$ is shown on the y-axis. As shown by curve 210, the emissions are halved for each 10° C. drop in temperature. The hot cement kiln/preheater tower gases (which may typically be around 400° C.) must be cooled to around 150° C. to have acceptable emissions of around 50 $mg/Nm^3$ from the ESP. For the typical mill-on condition, the GCT is set to cool the gases to ≈250° C. so there is sufficient heat left in the gases to preheat and dry the raw feed in the mill. (In this example, passing the gas flow through the raw feed mill further cools it to ≈150° C., which is the proper temperature for the ESP.) On the other hand, in the mill-off condition, the GCT must be set to cool the gas flow to ≈150° C. to insure that the effluent dust is properly conditioned for capture by the ESP.

State-of-the-art GCT designs utilize a plurality of two-fluid nozzles to inject and distribute the cooling water droplets into the gas flow inside the tower. These nozzles, such as the MICROMIST™ nozzles manufactured by the assignee of the present invention, and the SWIRL-AIR™ nozzles manufactured by Delavan, Inc., Lexington, Tenn., use compressed air to atomize the cooling water into fine droplets that quickly evaporate. A two-fluid nozzle is connected to a source of water and a source of compressed air. Both the water and compressed air supply can be controlled, and by adjusting the two flows the amount of water injected into the gas flow and the size of the droplets in the spray formed by the nozzle can be independently adjusted. There is substantial interaction between water and air pressure settings in most two-fluid nozzles, especially internal mix types. Therefore, precise control of nozzle performance under varying gas conditions is required to maintain proper ESP performance at all times. As might be expected, the quantity of water injected by the nozzle is largely dependent on the pressure of water flowing to the nozzle. The size of the droplets formed by the nozzle, on the other hand, is more dependent on the compressed air flow to the nozzle. While finer droplets evaporate and exchange heat faster than larger droplets, they require a greater quantity of compressed air. Supplying the additional compressed air, in turn, requires a greater energy input and, thereby, reduces the operational efficiency of the air pollution control system.

Under normal operating conditions, the water spray into the GCT should, preferably, be totally evaporated before reaching the bottom of the tower. Normally, water flow to the nozzles is modulated to control the temperature of the gases exiting the GCT to a desired set point, or target temperature, by controlling the quantity of water injected into the GCT. Sometimes the compressed air pressure and, therefore, air flow to the nozzles is also modulated to help maintain a temperature set point by varying the droplet size.

A particularly difficult requirement for an ESP used in the above example is to maintain high collection efficiency when the raw mill unexpectedly goes off-line. Hot, dry gases from the GCT at ≈250° C. for the mill-on condition are immediately routed to the ESP to protect the raw mill from damage. These hot gases immediately degrade ESP performance as indicated in FIG. 2. The outlet temperature set point of the GCT must be reset to the mill-off value, i.e., ≈150° C., for the new mill-off condition. In the prior art, the temperature set point is reset manually and the control system for maintaining the new temperature set point for the GCT relies on a temperature sensor at the output of the GCT which continuously measures the temperature of the exiting gases and adjusts the nozzles via a controller to maintain a desired temperature set-point. Examples of prior art control techniques are disclosed in U.S. Pat. No. 3,842,615, and in a brochure entitled "*MicroMist™ Evaporative Gas Cooling and Conditioning Systems*" distributed by the assignee of the present invention, the disclosure of which is incorporated by reference.

However, in prior art methods, by the time the temperature set point is physically changed and the temperature sensors, nozzles and controllers respond to bring the system to the new temperature set point, the "filter cake" on the collecting plates in the ESP becomes dried out and highly resistive. It then takes much more time to recondition the filter cake layers than it did to heat them up and dry them out. Typically the filter cake layers dry out very quickly, sometimes in less than a minute, while it may take 30 minutes to 2 hours after proper gas conditioning has been restored to the ESP, before the ESP returns to normal operation. This type of event often results in emissions by the plant which exceed allowable levels which may constitute a violation of applicable pollution control standards.

The costs of operating a pollution control system can be very significant. Energy costs are often the paramount factor in determining the overall operation expense of the system. In GCTs of the type which utilize two-fluid nozzles, much of the energy consumed by the system is used to create the compressed air employed by the system. Many prior art systems, of the type heretofore described, are designed such that the GCT is optimized to efficiently cool the gas flow during upset conditions, i.e., when the demands on the system are the greatest. The prior art systems are not optimally efficient under normal operating conditions, as when the feed mill is on line, and the cooling requirements are reduced.

Accordingly, it is an object of the present invention to provide an improved automatic control system for evaporative cooling which responds immediately to the needs of the downstream collector.

Another object of the present invention is to provide an improved automatic control system for evaporative cooling wherein the size of the injected droplets are controlled for the conditions of use.

Another object of the present invention is to provide an improved automatic control system for evaporative cooling which minimizes the compressed air consumption of the atomizing nozzles according to the demands of the cooling system.

Yet another object of the present invention is to provide an improved automatic control system for evaporative cooling which maintains conditions that result in a high collection efficiency in the downstream collector while reducing the energy input to the system, as compared to the prior art.

SUMMARY OF THE INVENTION

The foregoing objects of the present invention, and others that will be apparent to those skilled in the art after reading this specification in conjunction with the accompanying drawings and the appended claims, are realized in an air pollution control system associated with a source of air pollution by a novel automatic control system for evaporative cooling. In one aspect, the present invention comprises nozzle means for forming a spray of liquid to be introduced into the air pollution control system; spray control means, associated with said nozzle means, for adjusting the characteristics of the spray introduced into the air pollution control system; a first control loop means associated with said spray control means under a first operational state; and, second control loop means associated with said spray control means upon the onset of a second operational state. The first operational state may comprise normal or steady state operation of the source of the source of air pollution, such as a cement plant, and the second operation state may comprise abnormal operation of the source during, for example, an upset condition. The first control loop means may comprise means for determining the difference between the temperature of the flow within the air pollution control system, such as near the exit of a gas conditioning tower, and a target temperature, and for adjusting the spray when the difference exceeds a predetermined amount. The second control loop means may comprise means for rapidly readjusting the spray upon the onset of said second set of operating conditions, and may comprise timer means for injecting the increased spray for a predetermined time period. In another embodiment, the increased spray may be maintained until the temperature of the gas flow reaches a predetermined temperature, which may be different than the target temperature.

In another aspect, the present invention relates to an apparatus for controlling the spray introduced into a gas conditioning tower used in connection with an air pollution control system comprising, a two-fluid nozzle for introducing an atomized spray of liquid into the gas conditioning tower, the two-fluid nozzle being connected to a source of cooling liquid and a source of pressurized air, and nozzle control means for regulating the flow of air and the flow of cooling liquid to the nozzle, the nozzle control means being adapted to substantially minimize the air pressure to the nozzle in producing a spray which causes a desired degree of cooling of the gases flowing through said gas conditioning tower over the normal range of gas flows, desired temperature set points and water flows of the gas conditioning tower.

In yet another aspect, the present invention relates to apparatus for controlling the spray introduced into a gas conditioning tower used in connection with an air pollution control system, comprising, a two-fluid nozzle for introducing an atomized spray of liquid into the gas conditioning tower, the two-fluid nozzle being connected to a source of cooling liquid and a source of pressurized air, said source of pressurized air comprising an air compressor; and control means for regulating the flow of air and the flow of cooling liquid to said nozzle, said control means being adapted to regulate the pressure output from said air compressor.

BRIEF DESCRIPTION OF THE DRAWINGS

FIG. 1 is process flow diagram of a typical modern cement factory showing the air pollution control equipment and raw feed mill.

FIG. 2 is a graph showing the relationship between particulate emissions and gas temperature in an electrostatic precipitator used in a modem cement factory such as depicted in FIG. 1.

FIG. 3 is a flow chart showing a method according to one aspect of the present invention.

FIG. 4 is a logic block diagram of the control loops of the present invention.

FIG. 5 is a graph showing the relationship between liquid flow and air pressure to a two fluid nozzle in two prior art configurations and in accordance with the present invention.

FIGS. 6a and 6b are graphs showing the relationship between droplet size, cooling water flow and tower outlet temperature.

FIGS. 7a and 7b are graphs showing the relationship between compressed air flow and water flow in two-prior art nozzles in comparison to the present invention.

FIG. 8 is a graph showing the relationship between power consumption, flow capacity and compressor operating pressure.

DETAILED DESCRIPTION OF THE PREFERRED EMBODIMENT

Turning first to FIG. 1, the air pollution control system associated with a cement manufacturing facility is shown in a partially schematic diagram. While the present invention is described, in a preferred embodiment, in connection with a cement manufacturing facility, those skilled in the art will recognize that it has equal application to air pollution control systems used with other sources of air pollution.

Hot gases from a preheater tower (not shown) enter a gas conditioning tower (GCT) 10. (The gas flow entering GCT 10 is shown schematically by flow arrow 15.) Gases entering the GCT from may be as hot as 400° C. Nozzle means 50 located within GCT 10, near the entrance thereto, injects a spray of cooling liquid into the hot gas flow in the tower. As depicted, nozzle means 50 preferably comprises a plurality of individual nozzles 55, in order to ensure that the injected spray is evenly distributed into the gas flow, thereby promoting uniform cooling. In one preferred embodiment, the nozzles are arranged about an annular manifold. Preferably, individual nozzles 55 are two-fluid nozzles connected by supply pipes 56 and 57 to a source of water and compressed air, respectively. The flow of water and air to the nozzles is modulated by valves 58 and 59, respectively. Valves 58 and 59 are controlled by logic and control system 60 to maintain a spray of desired characteristics. Logic and control system 60 preferably is also used to monitor various system parameters and to adjust the spray as conditions change. As is known in the prior art, for example, a temperature sensor 70 may be placed near the exit of GCT 10 to monitor the temperature of the gas flow leaving the GCT. Logic and control system 60, described in greater detail below, uses the information from temperature sensor 70 to determine whether the temperature leaving GCT 10 is within a desired target range. If the temperature is outside of the target range, logic and control system 60 responds by adjusting the spray accordingly. Other sensors may also be employed and connected to the logic and control system, such as a sensor (not shown in FIG. 1) for measuring the temperature of the gases flowing into GCT 10.

Gases exit GCT 10 via outlet 80 preferably flow into a raw feed mill 20 to help dry the wet limestone used in the cement plant, and then on to electrostatic precipitator (ESP) 30. As described, however, during a plant upset, when the raw feed mill is not in operation, gases flow directly from GCT 10 to ESP 30 as shown by flow arrow 40. When ESP 30 is properly functioning, dust particles in the effluent gas flow are collected in the ESP 30 with a very high efficiency. Generally, collection efficiency is enhanced when the temperature of the gases entering ESP 30 are relatively cool. As shown in FIG. 2, in one embodiment, collection efficiency drops dramatically at temperatures greater than about 150° C. Accordingly, proper operation of the ESP dictates that the gases entering it be maintained at about this temperature or lower. Moreover, at higher temperatures the collected particulate material, which forms a filter cake on the electrodes of the ESP, quickly dries out which further adversely affects the performance of the ESP. Proper operation of the ESP requires that a relatively high moisture content be maintained in this collected material. The operation of ESPs in general is well known in the art and need not be discussed in great detail.

After leaving ESP 30, the gases are exhausted into the atmosphere via stack 90. The gases are propelled through the air pollution control system using fans 101 and 102. (As will be apparent to those skilled in the art, fan 102 is only used when the gases are directed through feed mill 20.)

In the preferred embodiment, logic and control system 60 comprises a central processing unit ("CPU") including a microprocessor, a random access memory, permanent memory (such as one or more EEPROMs) comprising software for implementing the various control algorithms described herein, and various input/output ("I/O") "cards" for communicating between the CPU and the system sensors, described herein, and control devices, such as valves. As will be recognized by those skilled in the art, suitable logic and control units and I/O cards are commercially available from a number of sources. One system used by the inventors is sold by Siemens under the model designation "Siematic S5-103."

Under normal operating conditions, the gases in the system are directed to raw feed mill 20; (this condition will be referred to as the "mill on" condition). As noted above, the feed stock in feed mill 20 is cool and wet, and presents a relatively large surface area to the hot gases entering the feed mill. Thus, as hot gases from GCT 10 pass through the feed mill they are further cooled and moisturized. For example, in one embodiment, if it is desired that the gases exiting feed mill 20 be at a temperature of 150° C., they may be as hot as 250° C. when they leave GCT 10. On the other hand, during an upset condition, (referred to as the "mill off" condition), as when the feed mill malfunctions, it is normally imperative to quickly divert the flow of hot gases away from the feed mill in order to avoid damage to the mill. Under these circumstances the gas flows along the path shown by arrow 40, directly into ESP 30.

Unless the diversion of gas flow has been anticipated and the temperature set point adjusted in advance, a circumstance which is normally unlikely, the temperature for the gases leaving GCT 10 will be much higher than is desirable for direct flow to ESP 30. As noted, if the gases entering ESP 30 are too hot, not only does collection efficiency fall off dramatically, but also the filter cake on the electrodes will quickly dry out, further degrading ESP performance, and prolonging the period during which ESP performance will be substantially degraded. Once the electrodes have dried out it can take up to a half an hour or more before they can be reconditioned and normal ESP operation restored. However, prior art control systems for maintaining the temperature at the output of a GCT are designed to maintain a temperature set point of the exiting gases rather than to quickly adjust the temperature of the flow to a new set point, as is required in response to a plant upset. Thus, in prior art systems, even if the new temperature set point is immediately entered into the control system, the feedback control loop which is used by the system to maintain the new target temperature of the outlet gas flow will not respond quickly enough to prevent an upset of the ESP due to drying out of the filter cake on the electrodes.

As recognized by the present inventors, a sudden lowering of the outlet temperature of the gases leaving GCT 10 is required immediately when there is a switch from mill-on to mill-off conditions in order for ESP 30 to work effectively. This is not possible with prior art because the response time of temperature control logic and elements are too slow to prevent an upset in the ESP. Resetting the outlet temperature set point from $\approx 250°$ C. to $\approx 150°$ C. when the mill is taken off line typically requires at least 5 minutes in prior art systems for the outlet temperature of the GCT to approach 150° C. In addition, in the prior art the change in the temperature set point is entered manually and the operator must remember to change the set point during a crisis time in the plant control room. As noted, it is normally not possible to anticipate the mill outage 5 to 15 minutes in advance and then switch the gas flow to the ESP only when it is near the new set point. Moreover, this would require sequenced manual changes in different control systems again at a crisis time in the plant control room.

According to the present invention rapid cooling of the output of GCT 10 is achieved by employing an override control loop when the mill goes off-line. The mass flow rate of the gases entering the GCT is calculated periodically using controller 60 and the result is stored in the controller memory. When a "mill off" signal is received, nozzle control system 60 switches from the normal outlet temperature control loop to the override control loop which uses the stored value of mass flow to calculate the required water flow for the new outlet temperature set point for mill-off operation. This override loop, which may also be referred to as a water flow control loop, is used to control the injected water flow for a predetermined period of time, such as ten minutes, or until the outlet temperature of the gas is within a few degrees, (e.g., 10° C.) of the new outlet temperature set point. Controller 60 then resumes use of the normal outlet temperature control loop using the new mill-off temperature set point, which was reset when the mill off signal is received. The override control loop immediately increases the water flow to the nozzles substantially to cause a very rapid cooling of the gases exiting GCT 10.

A flow diagram of the preferred method of one aspect of the present invention is shown in FIG. 3, to which we now turn. For convenience, the flow diagram starts when the system has achieved steady state operation. Thus, in initial block 310, the temperature set point for mill on operation has been entered into the system which is implementing a feedback control loop to maintain the output temperature of the GCT gases in a target range about the temperature set point. As shown in blocks 320 and 330, during steady state operation, the system periodically calculates the gas flow through the GCT and monitors for a mill-off signal. When a mill-off signal is detected, the temperature set point of the system is reset to the mill-off value (e.g., $\approx 150°$ C. in the above example) and, in block 350, new spray parameters are calculated for the new temperature set point based, in part, on the mass flow data calculated in step 320. Once the new spray parameters are calculated, the system implements an override control loop in milliseconds, as shown in block 360, using the calculated spray values, and continues to monitor the temperature of the gases exiting the GCT. The override control loop remains in effect until either the temperature of the gases has been lowered to within a new target temperature range (block 370), or until a predetermined time ($t_0$,) has elapsed (block 380). When one of these conditions has been fulfilled, the temperature feedback control loop resumes control of the system using the new temperature set point of block 340.

A logic block diagram disclosing apparatus used to implement these control loops is shown in FIG. 4. Sensors $T_I1$ (411) and $T_I2$ (412) monitor the temperature of the gas flowing into GCT 10, and sensors $T_O1$ (413) and $T_O2$ (414) monitor the temperature of the gas flowing out of GCT 10. Dual input and output sensors are employed in the preferred embodiment for redundancy. The data from temperature input sensors 411 and 412 are compared at block 415 and the value which is greater is used by the system as $T_I$. Likewise, the data from temperature output sensors 413 and 414 are compared at block 416 and the value which is greater is used by the system as $T_O$. Flow sensor 420, measures the water flow ("WF") 425 to the nozzles. The measured values of $T_I$, $T_O$ and WF are used by the control system at block 460 to calculate the value of the mass flowing through GCT 10. This calculation is made at regular time intervals, such as 100 per second, and is stored in memory for use if the mill should go off-line, as described herein.

As shown in FIG. 4, control system 60 provides two distinct control loops. The first control loop is employed when the mill is in a steady state condition, such as when the mill is on or after the system has been adjusted to a mill off condition. Mill state detector ("MS") 430 has two logical conditions: logical 0 for when the mill is in its steady state condition, and logical 1 for when the mill is in an upset condition, such as immediately after the mill goes off line. During the steady state operation, water and air flow to the nozzle is controlled by temperature control loop 440 ("TCPID") based on a temperature set point $T_O S_O$ 445. Temperature set point 445 may either be entered by the system operator, stored in memory or calculated. One or more current to pressure transducer(s), 450, is (are) used to control the valve(s) 58 (and 59, if applicable, not shown in FIG. 4).

When the mill goes off line, a signal is received by mill state detector 430 which immediately switches over to logical condition 1. Using temperature set point $T_O S_1$, which has been stored in memory, and the mass flow information from block 460, the system calculates a new water flow ("WF") necessary to cool the calculated mass of gas to the new temperature set point, ("WFMO"). This calculation is shown at block 475 and is used by the water flow control loop ("WFPID") of block 480, which has been set to control transducer(s) 450. Thus, when a mill off signal is received water flow control loop 480 overrides the normal temperature control loop 440. In the preferred embodiment, override or water flow control loop 480 remains operative until either the temperature of the gas flow leaving GCT 10 is within 10 degrees of the desired output temperature, or until a set time period has elapsed, whichever occurs sooner. When either of these events occur, the system returns to logical state 0 and the normal "steady state" temperature control loop takes over, however using the new temperature set point for mill off operation.

It is noted that there is no need to employ override control loop 480 when the mill goes back on line. In such an event, it is merely necessary to communicate a new temperature set point to the temperature control loop reflecting the fact that the gas leaving GCT 10 need no longer be as cool. Under these circumstances, i.e., the gas from GCT 10 is cooler than necessary, there is no risk of damage to the system and there is no imperative need for a quick response. Thus, the normal feedback control is adequate. Nonetheless, it is considered to be within the scope of the present invention to use an override control loop when the mill goes back on line.

In one embodiment, the formulas used for control of abrupt fluctuations are as follows:

$$m = \frac{L[2T_O + 2,416]}{[0.0001(T_O - 150) + C_p](T_I - T_O)} \quad \text{Mill-on} \qquad \text{Eq. 1}$$

Where:
L=cooling water flow (m$^3$/hr) set point.
$T_I$=inlet gas temperature (°C.) measured.
$T_O$=outlet gas temperature (°C.) setpoint for mill-on.
$C_p$=constant input value (kJ/kg°C. @ 150° C.).
m=calculated mass flow of gases (Mg/hr).
and:

$$L' = \frac{m[0.0001(T_O' - 150) + C_p](T_I - T_O')}{[2T_O' + 2,416]} \quad \text{Mill-off} \qquad \text{Eq. 2}$$

Where:
L'=new cooling water flow (m$^3$/hr) setpoint.
$T_I$=inlet gas temperature (°C.) measured (for mill-on condition).
$T_O'$=new outlet gas temperature (°C.) setpoint for mill-off.
$C_p$=constant input value (kJ/kg°C. @150° C.).
m=calculate mass flow of gases (Mg/hr) for mill-on condition from Eq. 1.

As noted, the calculated water flow for the new, mill-off condition is sent immediately by controller 60 to the water flow control valve which injects the necessary water (approximate by calculation) for the new outlet temperature set point. Using this method the temperature of the gases exiting the GCT can be reduced to near the new set point in seconds, faster than the outlet temperature sensors 413, 414 can respond to the temperature change, preserving the required gas conditions in the ESP immediately after a mill outage.

In a further aspect of the present invention, the compressed air usage of nozzle means 50 can be substantially reduced at low water flow conditions (i.e., raw mill-on conditions) to reduce total energy consumption. Since the mill-on condition is the predominant usage of the pollution control system, the energy savings and, therefore, the operational savings will be significant. In a typical cement plant application, the mill-on condition may account for 85% of the system usage. According to the present invention, nozzle controller 60 is programmed to employ a novel, non-linear relationship between the atomizing air pressure for different water pressures or flows to reduce the air pressure to the nozzles at low water flow conditions ("turn down"). Specifically, the present inventors have determined that prior nozzle control systems have tended to over atomize the spray into the GCT during mill-off conditions. This over atomization of the spray does not lead to increased cooling of the gases. Once the spray form the nozzle is fully evaporated its ability to cause cooling of the gases is substantially exhausted. It is well-known that the rate of evaporation of a spray is a function of the size of the spray droplets. As recognized by the inventors hereof, ideally, the droplets from the spray should not be fully evaporated until the just reach the exit of the GCT. If the spray becomes fully evaporated substantially prior to reaching the exit of the GCT, then the spray droplets are smaller than they have to be and, thus, the spray has been over atomized. Since spray atomization is achieved by using energy in the form of compressed air, over atomization of the spray results in wasted energy.

Turning to FIG. 5, a graph of the gas pressure at the nozzle (in psig) is shown on the y-axis and liquid flow (in gpm) shown on the x-axis, for three different methods of flow control. Curve 510 shows the relationship taught by Delavan, Inc., for the use of its nozzles. Note that the teaching is to use a constant air pressure of approximately 100 psig, and to merely modulate the water flow to the nozzle. In contrast, the prior art teachings of the assignee of the present invention are to vary the air pressure in a linear relationship to the water flow as shown by curve 520 of FIG. 5.

In contrast, according to the novel method of the present invention, controller 60 reduces the air pressure to below prior art minimum values as shown in curve 530 of FIG. 5, thereby increasing the droplet size injected at low water flow in comparison to the prior art, thereby saving energy and reducing the operating costs of the pollution control system. The larger droplets used by the present invention are acceptable because the reduced water demand is the result of either a higher outlet temperature set point (i.e., for mill-on conditions), or lower gas flow rates. Higher outlet temperatures increase the evaporation rate in the GCT, since the average temperature in the GCT is greater, and lower gas flow increases residence time, so the larger droplets are totally evaporated in the GCT.

Referring to the graphs in FIG. 6 the relationship between droplet size, water flow and outlet temperature are depicted. These graphs, which were developed by the inventors using computer modeling techniques, show that it is possible to reduce droplet size used in a GCT under mill-on conditions, thereby saving energy. Data, such as that shown in FIGS. 6a and 6b, were used to develop non-linear characteristic curve 530 shown in FIG. 5. FIG. 6a shows two, related curves depicting the required droplet size versus GCT outlet temperature (curve 610) and cooling water flow (as a percentage of maximum) versus GCT outlet temperature (curve 620), for a constant gas flow through the GCT. Thus, the x-axis of both curves is GCT outlet temperature. The y-axis for curve 610 is the droplet size in microns, and is shown at the left edge of the graph. As shown, the required droplet size decreases with lower GCT outlet temperature. The y-axis for curve 620 is the percent of maximum water flow, and is shown at the right edge of the graph. As shown, more water must be injected in to the GCT in order to lower the outlet temperature. During the mill-on condition, the GCT outlet temperature may be set at 250° C. Referring to curve 620 of FIG. 6a, this means that the water flow may be reduced to less than fifty percent (50%) of maximum flow, while curve 610 shows that the droplet size may be increased to 175 microns. On the other hand, during the mill-off condition, when the GCT outlet temperature is reduced to 150° C., the water flow must be increased to maximum (100%) flow and the droplet size reduced to 150 microns.

Turning to FIG. 6b, a similar graph is presented, however, the x-axis represents the flow of gas through the GCT as a percentage of maximum flow. Curve 630 represents the relationship between droplet size in microns (on the left y-axis) and gas flow. Curve 630 represents the relationship between water flow as a percentage of maximum flow (on the right y-axis) and gas flow. The graph of FIG. 6b presumes a constant GCT outlet temperature of 150° C. Thus, droplet size must decrease as gas flow through the GCT increases, while water flow increases as gas flow increases.

The reduced air pressure to the nozzle substantially reduces the compressed air consumption at low water flow rates when compared to the prior art operating curves for air atomizing nozzles. An example comparison follows:

TABLE 1

Mill off

| Nozzle Air (psig) | SCFM/GPM | GPM | BHP/SCFM | ENERGY (BHP) |
|---|---|---|---|---|
| Delavan-100 | 8 | 157 | 0.223 | 280 |
| ECII-90 | 8 | 157 | 0.223 | 280 |

TABLE 2

Mill on

| Nozzle Air (psig) | SCFM/GPM | GPM | BHP/SCFM | ENERGY (BHP) |
|---|---|---|---|---|
| Delavan-100 | 16 | 103 | 0.223 | 367 |
| ECII-50 | 11 | 103 | 0.233 | 252 |
| Invention-40 | 7.4 | 103 | 0.233 | 169 |

Delavan teaches to set the air pressure to the nozzle initially and thereafter to maintain a constant air pressure, as shown by curve 510 in FIG. 5. The cooling provided by the spray is controlled by modulating the liquid flow via liquid pressure. The prior art of the assignee of the present invention (EnviroCare International, Inc.—identified in Tables 1 and 2 as ECII) teaches increasing air pressure with increased water pressure in a linear relationship. The linear relationship, as shown by curve 520 in FIG. 5 was based on the company's previous experience with offset pressure type manual air flow control valves. According to the present invention a non-linear curve is used to define this relationship as shown in curve 530.

The graphs in FIGS. 7a and 7b show a comparison of the present invention with the prior art for compressed air consumption and droplet size at various water flows using 10 gpm nozzles. FIG. 7a shows the relationship between water flow (x-axis) and compressed air flow (y-axis), and FIG. 7b shows the relationship between droplet size (y-axis) and water flow (x-axis). Curves 710 and 740 are for the prior art Delavan teachings, curves 720 and 760 are for the prior teachings of the assignee of the present invention, and curves 730 and 750 are for the present invention. Both graphs use the curves of FIG. 5 to define the relationship between air pressure at the valve and water flow. As can readily be seen, the non-linear relationship of the present invention between water flow and air pressure to the nozzle results in the lowest air consumption at low water flows and is characterized by a slightly negative slope to the droplet size versus water flow curve. The non-linear relationship of curve 530 is programmed into the software that operates controller 60.

In accordance with another aspect of the present invention, further savings in energy consumption are made by actively regulating the output air pressure of the compressor thereby reducing the air pressure setting on the compressors at low water flow (e.g., mill-on) conditions. This is done by directly controlling the output pressure set point on the compressor(s) using GCT controller 60. In accordance with the present invention, the operating pressure set point on the compressor is adjusted to match the required nozzle supply pressure as calculated using curve 530. In a preferred embodiment of the present invention, the output pressure of the screw-type air compressor, (such an the Atlas-Copco GA 45-75 Series Oil Injected Rotary Screw Compressor), may be controllably varied between approximately 60–100 psig. In the prior art, the output pressure of the air compressor used in connection with a two-fluid nozzle for spraying liquid into a GCT was set at a constant value, usually at the highest setting. If less than the full pressure was required by the nozzle, as is generally the case during the predominant mill-on conditions, the prior art would simply reduce the pressure to the nozzle means by "wasting" the excess pressure (i.e., energy) across a pressure regulating valve or a compressed air flow control valve. As recognized by the inventors hereof, it is inefficient to generate a high pressure only reduce it much of the time. As previously described, during normal operating conditions, i.e., while the mill is on line, the droplet size can be increased, and hence air flow, can be reduced.

The air compressor delivers the required air flow volume at a lower energy consumption when working against 60 psig instead of 100 psig as shown in FIG. 8, which is a graph showing the relationships between compressor operating pressure (x-axis) and compressed air flow, curve 840, and BHP curve 830 (both of which are shown relative to the y-axis on the left), and the resultant BHP/SCFM curve 820 (shown relative to the y-axis on the right). The dramatic slope of curve 820, reflecting the substantial energy savings, is a surprising result given the relatively flat slopes of curves 830 and 840. It is believed that this is due to a compound effect whereby the SCFM increases at lower pressures due to less leakage within the compressor.

An example of the substantial energy savings which is possible using this method compared to the prior art for mill-on conditions is shown in the following Table 3:

TABLE 3

Mill on

| Control System | Nozzle Pressure (PSIG) | Compressor Pressure (PSIG) | SCFM/ GPM | Flow GPM | Energy Use BHP/SCFM | Energy Use BHP |
|---|---|---|---|---|---|---|
| ECII | 40 | 100 | 7.4 | 103 | 0.216 | 165 |
| New | 40 | 60 | 7.4 | 103 | 0.175 | 133 |

A 20% savings in energy consumption is realized through active control of compressor output pressure by GCT controller 60. Controller 60 determines lowest possible compressor pressure based on nozzle demand and communicates the instructions for the output pressure setting to the compressor controller(s) for example by way of a digital link using hexadecimal protocol through the compressor's sequencer interface.

The above are typical examples to show the amount of savings possible in cement plant applications. Since the mill-on condition is dominant time-wise in most cement plants, the annual energy consumption is controlled by mill-on operating conditions while system sizing is controlled by mill-off conditions (maximum water flow). These integrated novel systems substantially reduce the costs of operating BHP (kW) of evaporative coolers. Similar improvements in controlling upset conditions and reducing energy consumption can be realized by applying this novel art to other industrial applications by one skilled in the art.

What is claimed is:

1. A method for adjustably cooling a gas flowing through a gas cooling tower having a gas inlet and a gas outlet, the method comprising the steps of:

using a first control loop to adjust the characteristics of a spray of liquid from a nozzle to cool the outlet gas temperature to a temperature within a first target temperature range around a first predetermined temperature set-point for a first operational state;

detecting the onset of a change to a second operational state requiring that the outlet gas temperature be rapidly changed to within a second temperature range around a second predetermined temperature set-point; and upon detection of said changed operational state, implementing an override control loop to send control signals calculated to switch the characteristics of the spray of liquid from the nozzle to calculated spray characteristics selected to bring the outlet gas temperature to a temperature within said second temperature range;

wherein said spray characteristics are switched in a time period of less than one minute and before any substantial change in the thermal properties of the gas flow at the gas inlet.

2. The method of claim 1 wherein said first control loop implements the steps of:

measuring the temperature of the gas proximate to the gas outlet;

determining whether the measured temperature falls within the first temperature range; and readjusting the characteristics of the spray when the measured temperature falls outside of the first temperature range, in order to bring the outlet gas temperature of the gas flow into the first temperature range.

3. The method of claim 2 wherein the calculation of the spray characteristics for the second operational state comprises the steps of:

determining the liquid flow rate of said spray in said first operational state;

measuring the temperature of the gas at the gas inlet and the gas outlet;

calculating thermal properties of the gas flow based upon the liquid flow rate and the measured temperature change of the gas in the gas cooling tower;

periodically storing calculated thermal properties of the gas such that a step-change in spray characteristics required to change the outlet gas temperature to the second temperature set-point for the second operational state may be calculated; and calculating the required step-change in spray characteristics for the second operational set-point.

4. The method of claim 3, wherein the calculated step-change in spray characteristics is performed periodically.

5. The method of claim 4, wherein the change in spray characteristics is made when the onset of the second operational state is detected.

6. A method for cooling a gas flowing through a gas cooling tower having a gas inlet and gas outlet in which a change to a second operational state requires a rapid change in gas outlet temperature, the method comprising the steps of:

using a first control loop to adjust the characteristics of a spray of liquid from a two-fluid nozzle to cool the outlet gas temperature to a temperature within a first target temperature range around a first predetermined temperature set-point for a first operational state, the spray characteristics in the first operational state selected such that the quantity of cooling liquid sprayed is sufficient to provide the desired cooling and the spray substantially evaporates in the gas cooling tower;

detecting the onset of a change to a second operational state requiring that the outlet gas temperature be rapidly changed to a second temperature range around a second predetermined temperature set-point; and upon detection of said changed operational state, implementing an override control loop to send control signals calculated to switch the characteristics of the spray of liquid from the nozzle to calculated spray characteristics selected to bring the outlet gas temperature to a temperature within said second temperature range;

wherein said spray characteristics are switched in a time period of less than one minute and before any substantial change in the thermal properties of the gas flow at the gas inlet.

7. The method of claim 6, wherein the two-fluid nozzle produces spray droplets whose size depends upon air pressure and liquid flow rates.

8. The method of claim 7, wherein the quantity of compressed air used by the two-fluid nozzle is reduced by selecting the mean initial spray droplet size such that the spray droplets substantially traverse the cooling tower before evaporating prior to the gas outlet.

9. The method of claim 8 wherein an actively regulated compressor is used to supply the compressed air used by the two-fluid nozzle, the supply pressure of the actively regulated pressure controlled to deliver the required nozzle pressure.

10. A method for cooling a gas flowing through a gas cooling tower having a gas inlet and gas outlet in which a change to a second operational state requires a rapid change in gas outlet temperature, the method comprising the steps of:

using a first control loop to adjust the characteristics of a spray of liquid from a two-fluid nozzle to cool the outlet gas temperature to a temperature within a first target temperature range around a first predetermined temperature set-point for a first operational state, the spray characteristics in the first operational state selected such that the quantity of cooling liquid sprayed is sufficient to provide the desired cooling and the spray substantially evaporates in the gas cooling tower;

calculating thermal properties of the gas in the first operational state based upon the liquid flow rate and the measured temperature change of the gas in the gas cooling tower;

periodically storing calculated thermal properties of the gas;

detecting the onset of a change to the second operational state requiring that the outlet gas temperature be rapidly changed to a second temperature range around the second predetermined temperature set-point;

calculating new spray parameters for the second operational state based on the calculated thermal properties of the gas, the inlet gas temperature, and the second temperature set-point; and implementing an override control loop to send control signals calculated to switch the characteristics of the spray of liquid from the nozzle to calculated spray characteristics selected to bring the outlet gas temperature to a temperature within said second temperature range;

wherein said spray characteristics are switched in a time period of less than one minute and before any substantial change in the thermal properties of the gas flow at the gas inlet.

11. The method of claim 10, wherein the two-fluid nozzle produces spray droplets whose size depends upon air pressure and liquid flow rates.

12. The method of claim 11, wherein the quantity of compressed air used by the two-fluid nozzle is reduced by selecting the mean initial spray droplet size such that the spray droplets substantially traverse the cooling tower before evaporating prior to the gas outlet.

13. The method of claim 12 wherein an actively regulated compressor is used to supply the compressed air used by the two-fluid nozzle, the supply pressure of the actively regulated pressure controlled to deliver the required nozzle pressure.

14. A method for cooling a pollutant gas flowing through a gas cooling tower having a gas inlet and gas outlet in which a change to a second operational state requires a rapid change in spray characteristics, the method comprising the steps of:

using a first control loop to adjust the characteristics of a spray of liquid from a two-fluid nozzle to cool the outlet gas temperature to a temperature within a first target temperature range around a first predetermined temperature set-point for a first operational state, the spray characteristics in the first operational state selected such that the quantity of cooling liquid sprayed is sufficient to provide the desired cooling and the spray substantially evaporates in the gas cooling tower;

detecting the onset of a change to the second operational state requiring a change in spray characteristics;

calculating new spray characteristics for the second operational state selected such that the spray completely evaporates in the gas cooling tower;

implementing an override control loop to send control signals calculated to switch the characteristics of the spray of liquid from the nozzle to calculated spray characteristics; and maintaining the override control loop during the second operational state;

wherein said spray characteristics are switched in a time period of less than one minute and before any substantial change in the thermal properties of the gas flow at the gas inlet.

15. The method of claim 14, wherein the second operational state comprises a reduction in pressure of the compressed air used by the two-fluid nozzle compared with the first operational state.

16. The method of claim 15 wherein the step of calculating the spray characteristics for the second operational state is selected such that the spray droplets substantially traverse the gas cooling tower before evaporating.

17. The method of claim 14 wherein the second operational state comprises a substantial increase in the thermal load of the pollutant gas flow entering the gas inlet compared with the first operational state and the step of calculating the spray characteristics for the second operational state is selected such that the spray droplets substantially traverse the gas cooling tower before evaporating.

* * * * *

UNITED STATES PATENT AND TRADEMARK OFFICE
CERTIFICATE OF CORRECTION

PATENT NO. : 5,922,103
DATED : July 13, 1999
INVENTOR(S) : Schwab et al.

It is certified that error appears in the above-indentified patent and that said Letters Patent is hereby corrected as shown below:

In the ABSTRACT, line 19, after "regulate" insert --the--.

Column 1, line 14, after "become a" insert --high--.

Column 1, line 37, after "Therefore" insert --,--.

Column 2, line 5, after "operating" insert --,--.

Column 2, line 9, after "line", insert --the--.

Column 2, line 10, after "mill-on", insert --condition--.

Column 2, line 11, after "bypassed", insert --the--.

Column 2, line 12, after "mill-off", insert --condition--.

Column 2, line 16, delete "centigrade" and substitute therefore --Celsius--.

Column 3, line 3, after "raw' insert --feed--.

Column 3, line 5, after "raw" insert --feed--.

Column 3, line 27, after "Typically" insert --,--.

Column 3, line 32, delete the first instance of "which" and substitute therefore --that--.

Column 3, line 32, after "levels" insert --and--.

UNITED STATES PATENT AND TRADEMARK OFFICE
CERTIFICATE OF CORRECTION

PATENT NO. : 5,922,103
DATED : July 13, 1999
INVENTOR(S) : Schwab et al.

It is certified that error appears in the above-indentified patent and that said Letters Patent is hereby corrected as shown below:

Column 3, line 46, after "when the" insert --raw--.

Column 4, line 11, delete "said" and insert therefore --the--.

Column 4, line 12, delete "said" and insert therefore --the--.

Column 4, line 25, delete "said" and insert therefore --the--.

Column 4, line 61, after "is" insert --a--.

Column 5, line 6, delete "two fluid" and substitute therefore --two-fluid--.

Column 5, line 22, delete "partially" and substitute therefore --partial--.

Column 5, line 22, after "schematic" insert -- process flow--.

Column 5, line 52, after "temperature" insert --of the gas flow--.

Column 5, line 59, after "Gases" insert --that--.

Column 5, line 61, delete "As described, however," and substitute therefore --However,--.

Column 6, line 21, after "memory," insert --a--.

Column 6, line 22, after "EEPROMs)" insert --,--.

Column 6, line 22, delete "comprising".

Column 6, line 43, after "when the" insert --raw--.

UNITED STATES PATENT AND TRADEMARK OFFICE
CERTIFICATE OF CORRECTION

PATENT NO. : 5,922,103
DATED : July 13, 1999
INVENTOR(S) : Schwab et al.

It is certified that error appears in the above-indentified patent and that said Letters Patent is hereby corrected as shown below:

Column 6, line 45, after the first instance of "the" insert --raw--.

Column 6, line 45, after the second instance of "the" insert --feed--.

Column 7, line 8, after "with" insert --the--.

Column 7, line 9, after "time of" insert --prior art--.

Column 7, line 21, after "systems" insert --,--.

Column 7, line 27, delete "controller" and substitute therefore --controller's--.

Column 7, line 33, after "override" insert --control--.

Column 7, line 42, delete "substantially".

Column 7, line 53, after "gas" insert --mass--.

Column 8, line 21, after "100" insert --times--.

Column 8, line 55, after "degrees" insert --Celsius--.

Column 9, line 5, after "used" insert --to calculate new spray characteristics--.

Column 9, line 6, delete "fluctuations" and substitute therefore --changes in operational conditions--.

Column 9, line 66, delete the first instance of "the" and insert therefore --they--.

Column 10, line 7, after "in" insert --units of--.

UNITED STATES PATENT AND TRADEMARK OFFICE
CERTIFICATE OF CORRECTION

PATENT NO. : 5,922,103
DATED : July 13, 1999
INVENTOR(S) : Schwab et al.

It is certified that error appears in the above-indentified patent and that said Letters Patent is hereby corrected as shown below:

Column 10, line 7, after "in" insert --units of--.

Column 10, line 11, after "teaching" insert --of Delavan--.

Column 10, line 20, delete "thereby" and substitute therefore --thus--.

Column 10, line 28, after "flow" insert --rates--.

Column 10, line 28, after "increases" insert --droplet--.

Column 10, line 30, delete, "FIG. 6" and insert therefore --FIGS. 6a and 6b--.

Column 10, line 34, after "reduce" insert --the spray--.

UNITED STATES PATENT AND TRADEMARK OFFICE
CERTIFICATE OF CORRECTION

PATENT NO. : 5,922,103
DATED : July 13, 1999
INVENTOR(S) : Schwab et al

It is certified that error appears in the above-identified patent and that said Letters Patent is hereby corrected as shown below:

Column 10, line 36, after "two" delete ",".

Column 10, line 61, delete "630" and insert therefore --640--.

Column 11, line 56, delete "made" and insert therefore --achieved--.

Column 11, line 58, after "compressor" insert --,--.

Column 12, line 44, after "determines" insert --the--.

Signed and Sealed this

Fifteenth Day of August, 2000

Attest:

Q. TODD DICKINSON

Attesting Officer

Director of Patents and Trademarks